United States Patent [19]
Parks et al.

[11] Patent Number: 6,085,475
[45] Date of Patent: Jul. 11, 2000

[54] PORTABLE SEVERE WEATHER STORM SHELTER

[76] Inventors: James B. Parks, 5759 Bold Ruler Dr., Indianapolis, Ind. 46237; Wiley O. Boles, 3303 W. U.S. Hwy. 40 #91, Greenfield, Ind. 46140

[21] Appl. No.: 09/239,278
[22] Filed: Jan. 29, 1999

Related U.S. Application Data

[63] Continuation-in-part of application No. 08/929,610, Sep. 15, 1997.
[51] Int. Cl.⁷ .................................................. E02O 27/00
[52] U.S. Cl. ...................... 52/169.6; 52/169.14; 52/79.1; 52/79.14
[58] Field of Search ................... 52/169.6, 169.14, 52/79.1, 79.9, 79.14, 143; 220/560.03, 565, 62.15, 62.22; 135/900, 901, 902, 137, 116, 156

[56] References Cited

U.S. PATENT DOCUMENTS

| | | | |
|---|---|---|---|
| 3,609,978 | 10/1971 | Michie et al. | 61/5 |
| 4,432,171 | 2/1984 | Boot | 52/79.1 |
| 4,534,144 | 8/1985 | Gustafsson et al. | 52/169.6 |
| 4,567,939 | 2/1986 | Dumbeck | 165/16 |
| 4,607,467 | 8/1986 | Roux | 52/169.6 |
| 4,615,158 | 10/1986 | Thornton | 52/169 |
| 4,625,468 | 12/1986 | Hampel | 52/2 |
| 4,631,872 | 12/1986 | Daroga | 52/1 |
| 4,955,166 | 9/1990 | Qualline et al. | 52/169.6 |
| 5,007,244 | 4/1991 | Mori | 62/53.1 |
| 5,257,440 | 11/1993 | Bardou et al. | 24/287 |
| 5,542,780 | 8/1996 | Kourgli | 405/55 |
| 5,600,923 | 2/1997 | Riley | 52/79.9 |
| 5,773,756 | 6/1998 | DiTullio | 174/37 |

Primary Examiner—Beth A. Stephan
Assistant Examiner—Brian E. Glessner
Attorney, Agent, or Firm—Kyle S. Brant

[57] ABSTRACT

A portable storm shelter is disclosed. The shelter includes a thin plastic tank surrounded by a horizontal frame that includes anchor legs. The shell and frame are covered with a protective layer such as fiber-filled concrete. Two ventilation conduits extend through the protective layer and into the tank. A window is attached over apertures in the protective layer and the tank. A door is attached to the protective layer and situated over an aperture in the tank and in the concrete layer. A battery provides power to a fan disposed in fluid communication with one of the ventilation conduits. A solar cell is attached to the outer surface of the concrete layer and provides a charging signal to the battery. A fluid basin attached to a fluid drain conduit is also provided. The fluid drain conduit extends through the tank and concrete layer. In a second embodiment, a tank is surrounded by a horizontal rectangular frame. Attached to the frame are a plurality of vertical rods having lifting eyes. A protective layer is formed over the tank, frame and rods with the lifting eyes exposed. An inclined enclosed chute is attached to the protective layer over an aperture in the protective layer and tank. Ventilation and drainage conduits extend through the protective layer into the interior of the tank. A battery, electric lights and ventilation fans are disposed within the tank. Another embodiment includes vertical support ribs molded into the side walls of the enclosure and reinforcement rods inserted horizontally through apertures in the vertical ribs to provide enhanced structural support.

32 Claims, 13 Drawing Sheets

PORTABLE SEVERE WEATHER STORM SHELTER

RELATED APPLICATION INFORMATION

This application is a continuation in part of application Ser. No. 08/929,610, filed Sep. 15, 1997, entitled Portable Severe Weather Storm Shelter, now abandoned.

FIELD OF THE INVENTION

This invention relates to protective shelter structures and, more particularly, to an above ground portable severe weather storm shelter.

BACKGROUND OF THE INVENTION

Underground protective shelters have long been used by humankind for protection from severe natural weather phenomena such as tornadoes, hurricanes, severe thunderstorms and the like. Typically, such a shelter is built underground to provide maximum protection from high velocity winds, flying projectiles and hail. The construction of such shelters has taken on many different forms, including dirt, brick and concrete structures. However, a primary disadvantage of such shelters is the permanent nature of such a structure, and the need for significant earth moving in order to construct such shelters.

Mobile home dwellers face the most serious danger from severe weather storms. Severe injuries and deaths are much more common with those living in a mobile home when severe weather strikes. Another shortcoming with such living arrangements is the typical leasing arrangement for the land upon which the mobile home is located. With a mobile home lot leasing arrangement, the lessee is less likely to be in a position to construct a permanent "in-ground" severe storm shelter without special permission from the lessor. Further, if a mobile home is moved, the expense in construction of a permanent shelter is lost as it becomes a fixture with the land. It is also fairly common for "snowbirds", or persons with winter homes in warmer climates, to own a mobile home yet not own the land upon which the mobile home is situated. For these and other reasons of portability convenience, a need exists for a portable severe weather storm shelter.

The portable severe weather storm shelter of the present invention is functionally easy to install and anchor permanently to the ground, less expensive than in-ground shelters, easy and safe to use as well as unique in its construction.

SUMMARY OF THE INVENTION

A portable severe weather storm shelter according to one aspect of the present invention comprises a reinforcement cage including a first rod and a second rod disposed in spaced-apart parallel fashion, the cage also including a third rod attached to the first rod and the second rod, and a fourth rod attached to the first rod and the second rod and spaced apart from the third rod to form a substantially rectangular opening, a thin-walled tank having sidewalls, a top and a bottom, the sidewalls having a first aperture and a second aperture therein, the thin-walled tank disposed in the substantially rectangular opening of the reinforcement cage, a concrete layer formed about the tank and the reinforcement cage and including a first and second apertures aligned with the first and second apertures of the tank and a latch receiving means for receiving a latch mechanism, a hinged door attached to the concrete layer and disposed over the first aperture of the concrete layer, the hinged door including latch means for securing the hinged door to the latch receiving means, and a ventilation conduit disposed in and through the second aperture of the thin-walled tank and the second aperture of the concrete layer.

A portable severe weather storm shelter, according to another aspect of the present invention, includes a reinforcement cage including a first rod and a second rod disposed in spaced-apart parallel fashion, the cage also including a third rod attached to the first rod and the second rod, and a fourth rod attached to the first rod and the second rod and spaced apart from the third rod to form a substantially rectangular opening, a thin-walled tank having sidewalls, a top and a bottom, the sidewalls having a first aperture and a second aperture therein, the thin-walled tank disposed in the substantially rectangular opening of the reinforcement cage, a protective layer formed about and encasing the tank and the reinforcement cage, the protective layer including a first hollow and a second hollow, the first hollow aligned with the first aperture of the tank, and the second hollow aligned with the second aperture of the tank, an inclined chute having side walls, a top, and a bottom defining a first opening and a second opening, and wherein the inclined chute is attached to the protective layer with the first opening situated adjacent and aligned with the first hollow of the protective layer, and wherein the second opening is situated at a location above the protective layer covering the top of the thin-walled tank, a door attached to the inclined chute and situated over the second opening of the inclined chute, latching means attached to the door for securing the door in a closed position over the second opening of the inclined chute, and a ventilation conduit disposed in and through the second aperture of the thin-walled tank and the second hollow of the protective layer.

One object of the present invention is to provide an improved severe weather storm shelter.

Another object of the present invention is to provide a severe weather storm shelter that is more easily manufactured.

Yet another object of the present invention is to provide a severe weather storm shelter that is portable in nature yet may be securely anchored to the ground.

Still another object of the present invention is to provide a severe weather storm shelter that is inexpensive to produce, utilizes inexpensive construction materials and includes human convenience features.

A further object of the present invention is to provide a severe weather storm shelter that is less expensive to construct yet is movable at a later time as a result of the unique features present in its design.

An additional object of the present invention is to provide a severe weather storm shelter that is convenient to install with lower expense in shipping thereof.

These and other objects of the present invention will become more apparent from the following figures and description of the preferred embodiment.

DESCRIPTION OF THE PREFERRED EMBODIMENT

Figure 1:
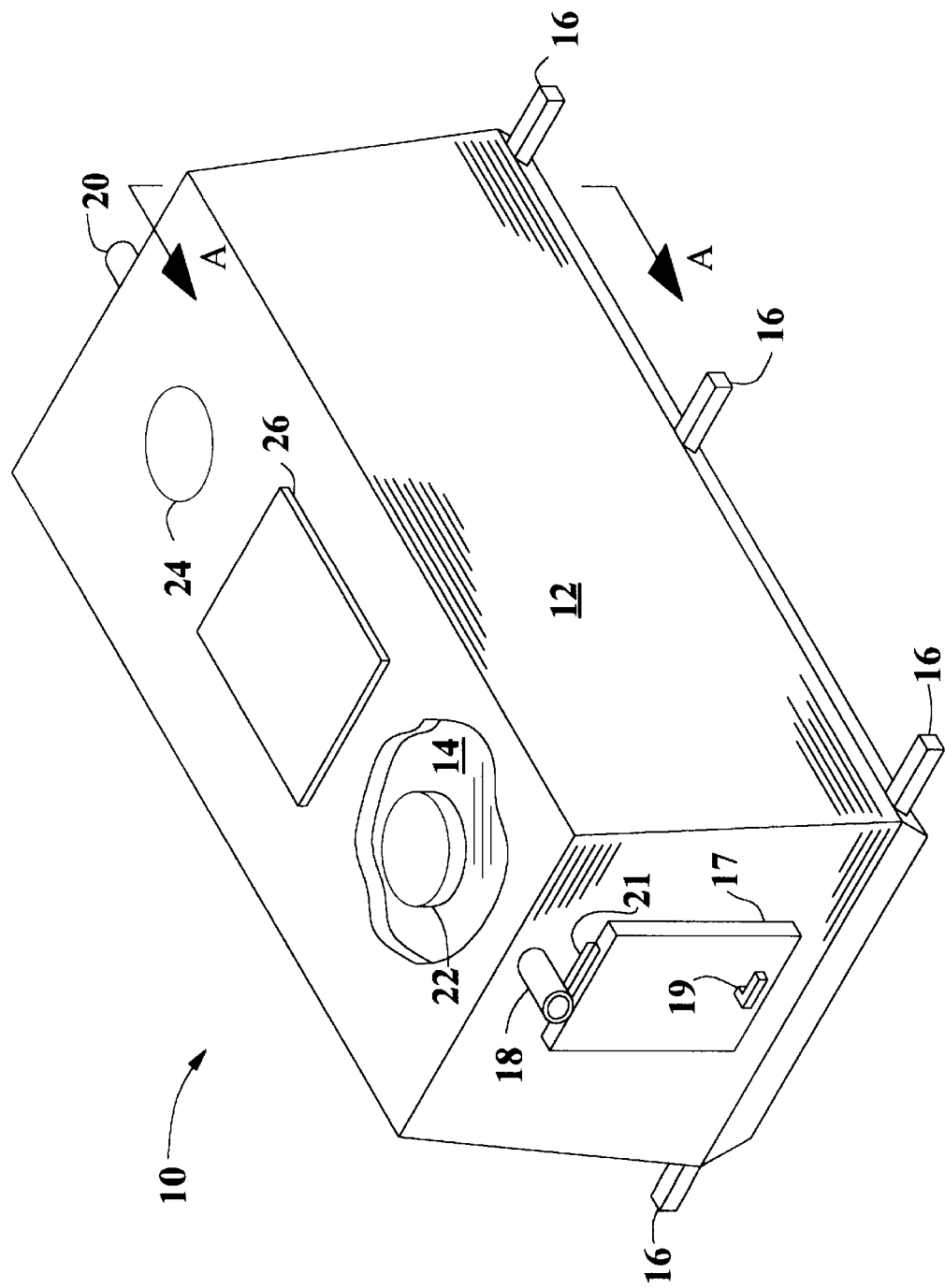
FIG. 1 is a perspective view of a portable severe weather storm shelter according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a perspective view of a portable severe weather storm shelter 10 according to the present invention is shown. The shelter 10 includes a protective layer 12 formed about a thin-walled tank 14. A rectangular reinforcement frame 16 (which is shown in more detail in FIG. 4) is surrounded by the protective layer 12 yet extends out through the protective layer 12 at six distinct locations (two of the six locations are not visible in FIG. 1). Each of the locations where the frame 16 protrudes through the protective layer provides a convenient location for attachment of an anchoring device (not shown) to securely attach the shelter 10 to the ground or other sturdy foundation.

A door 17 is hingedly attached to protective layer 12 by hinge 21. Hinge 21 is secured to protective layer 12. Door 17 is situated over an opening or aperture in layer 12 and a corresponding aperture in tank 14 thereby providing an access porthole for ingress and egress to the inner region of tank 14. Door 17 includes a latch handle 19 that secures door 17 in a closed position adjacent protective layer 12. Ventilation conduit 18 extends through the protective layer 12 and through the wall of tank 14 into the internal region of tank 14. Ventilation conduit 18 provides, a passageway through which fresh air flows. Ventilation conduit 20 extends through the protective layer 12 and through the wall of tank 14 into the internal region of tank 14 to provide a fluid conduit for exhaust gas or stale air. Windows 22 and 24 facilitate lighting of the internal region of tank 14 when ambient light is available. Protective layer 12 and tank 14 include apertures in which windows 22 and 24 are disposed. Solar panel 26 includes an array of solar cells that collect sunlight and transform the sunlight into electrical energy. The electrical energy produced by solar panel 26 is supplied to a battery (shown in FIG. 2) disposed within tank 14. Solar cell power is a convenient mechanism for ensuring a fully-charged state for battery 32 (FIG. 2) disposed within the tank 14. Electrical power is useful for powering ventilation fans and electric lighting located within the tank 14.

Tank 14 is constructed of a plastic material, such as polyethylene or similar plastic material. Protective layer 12 is preferably a fiber-filled concrete material that provides a maximum strength protective barrier against high winds, hail, and airborne objects. Windows 22 and 24 are made of Lucite® or Lexane® or other well known high strength transparent or translucent materials. Frame 16 is made from tubular steel rods welded together to form a rectangular shape as is shown in more detail in FIG. 4. Door 17 is made from metal or reinforced plastic or may be made from materials well known in the art for strength and durability.

Figure 2:
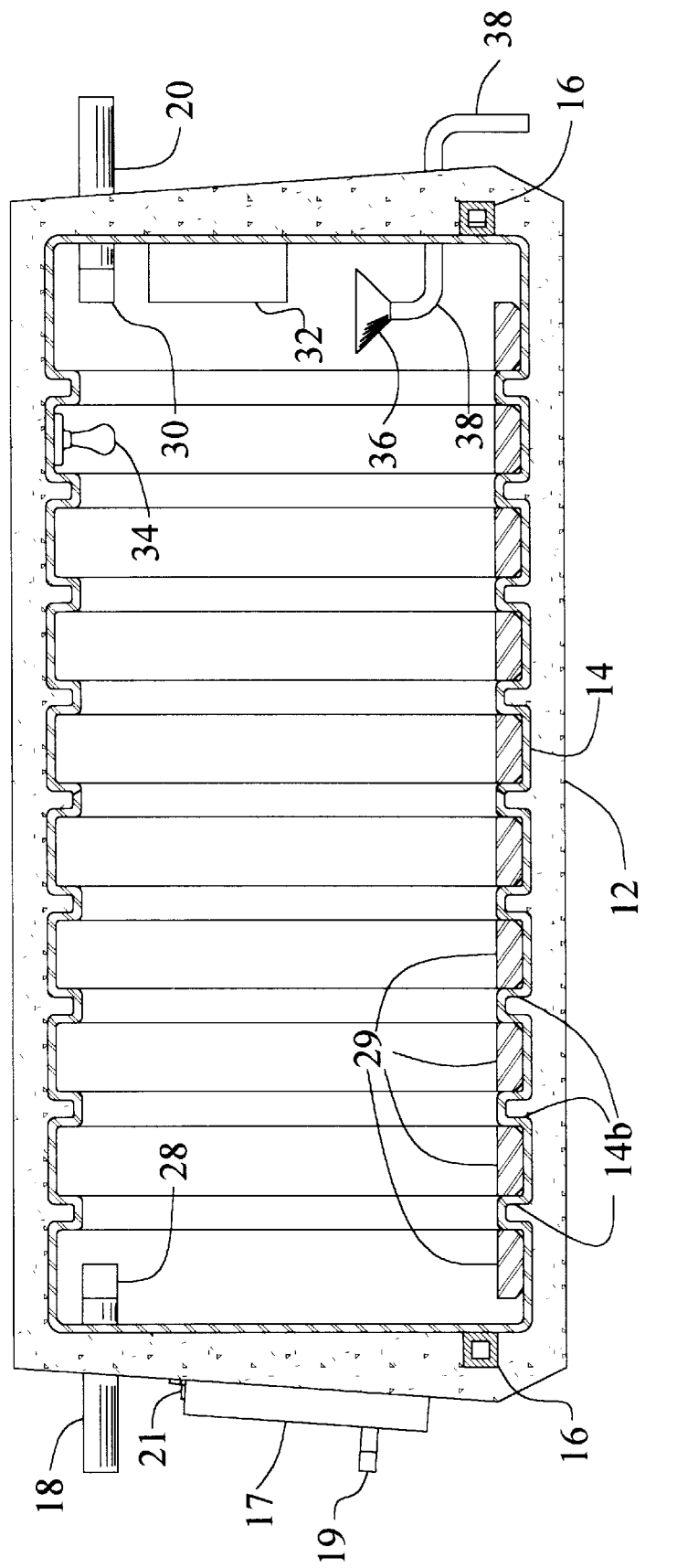
FIG. 2 is a cross-sectional view of the storm shelter of FIG. 1 looking in the direction of the arrows labeled A—A.

Referring now to FIG. 2, a cross-section of the portable severe weather storm shelter 10 looking in the direction of the arrows labeled A—A of FIG. 1 is shown. Protective layer 12 is formed about tank 14 and substantially surrounds tank 14 with the exception of any apertures discussed herein. Frame 16 is shown located adjacent tank 14. Frame 16 is sized to fit closely about tank 14 so that the process of forming protective layer 12 about tank 14 is readily facilitated. Attached to the inner portion of ventilation conduit 18 is a ventilation fan 28. Ventilation conduit 20 also includes a ventilation fan 30 attached to the conduit at a location in the inner region of tank 14. Although only one fan is actually necessary to force air flow, a second fan provides a worthwhile backup mechanism should one fan fail to function correctly. Also shown is battery 32 mounted on the inner surface of tank 14. Battery 32 is electrically connected to light 34, fan 28 and fan 30 and provides a power signal to the light 34, fan 28 and fan 30. Solar Panel 26 (FIG. 1) is also electrically connected to battery 32 to provide a charging signal. Alternatively, solar panel 26 can be a highly efficient solar panel capable of delivering sufficient power to drive fans 28 and 30 as well as light 34. Side views of Door 17, hinge 21 and latch handle 19 are shown in FIG. 2. Also shown is drainage basin 36 and a drain pipe 38 attached to and in fluid communication with drainage basin 36. Ribs 14b are formed in tank 14 to add structural support thereto. Floor inserts 29 are disposed between ribs 14b to provide a level surface within the tank 14 for occupants to walk thereon. Floor inserts 29 extend substantially across the lower surface of tank 14. Floor inserts 29 are made of plastic or wood.

Figure 3:
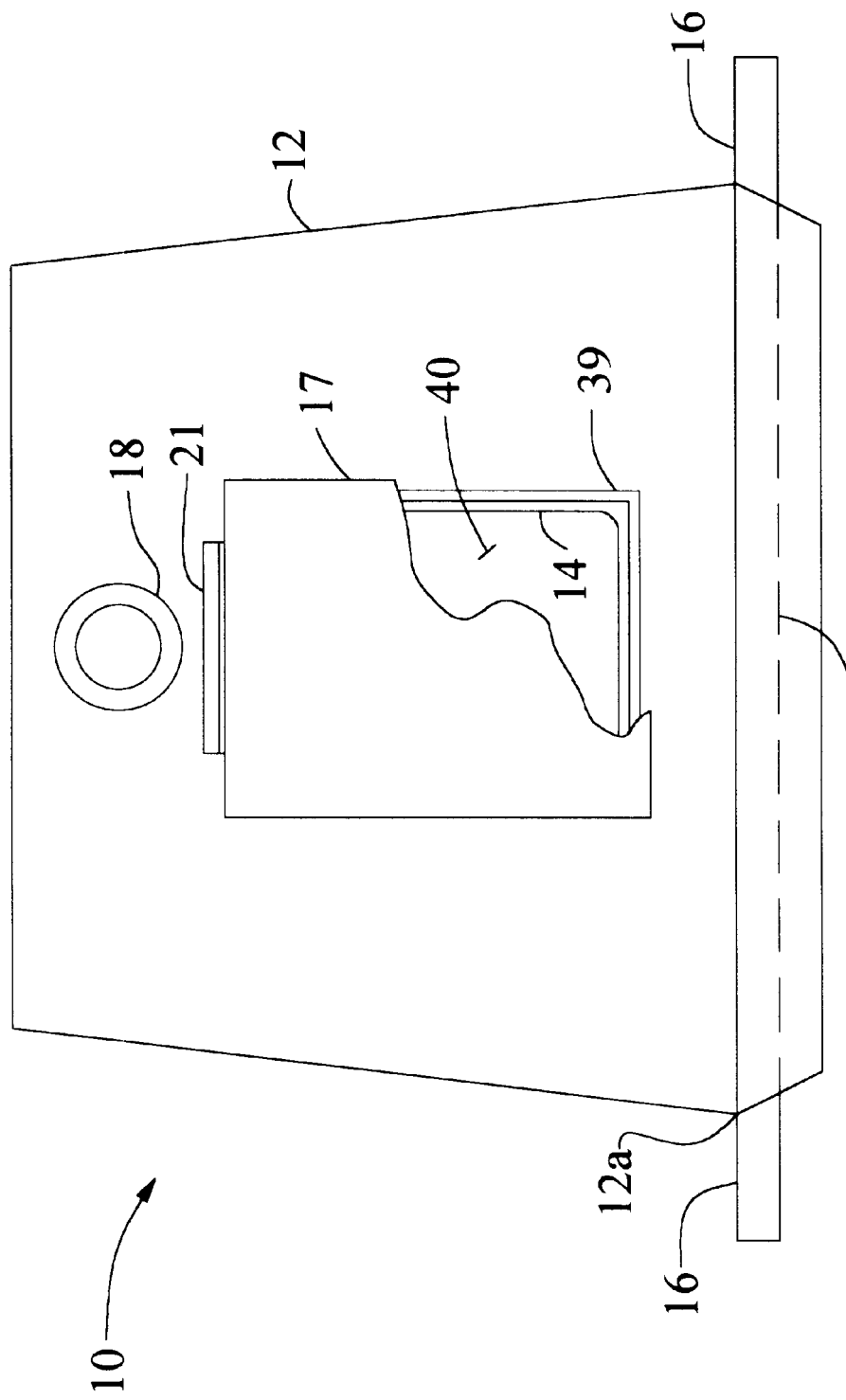
FIG. 3 is a side view of the storm shelter of FIG. 1.

Referring now to FIG. 3, a side view of the portable severe weather storm shelter 10 according to the present invention is shown. Door 17 is shown in partial cut-away fashion so that the rubber gasket seal 39 is partially viewable. Door aperture 40 is also partially viewable in FIG. 3. Rubber gasket seal 39 surrounds aperture 40 and is attached to protective layer 12 with adhesive or the like. Seal 39 provides an air tight seal between door 17 and protective layer 12. Door aperture 40 is slightly smaller in dimensions than door 17 and provides ingress/egress to the interior of tank 14. Reinforcement frame 16 is shown extending into the protective layer 12 and is also indicated by the hidden line B. Ventilation conduit 18 and hinge 21 are also shown.

As is most apparent from the view of FIG. 3, the protective layer 12 tapers inward at 12a in an upward and downward direction. The tapering is present on all substantially vertical sides of protective layer 12. Such tapering is desired when molding concrete materials and the like about an object such as tank 14. Removal of forms used in forming the protective layer 12 is readily accomplished during the fabrication process.

Figure 4:
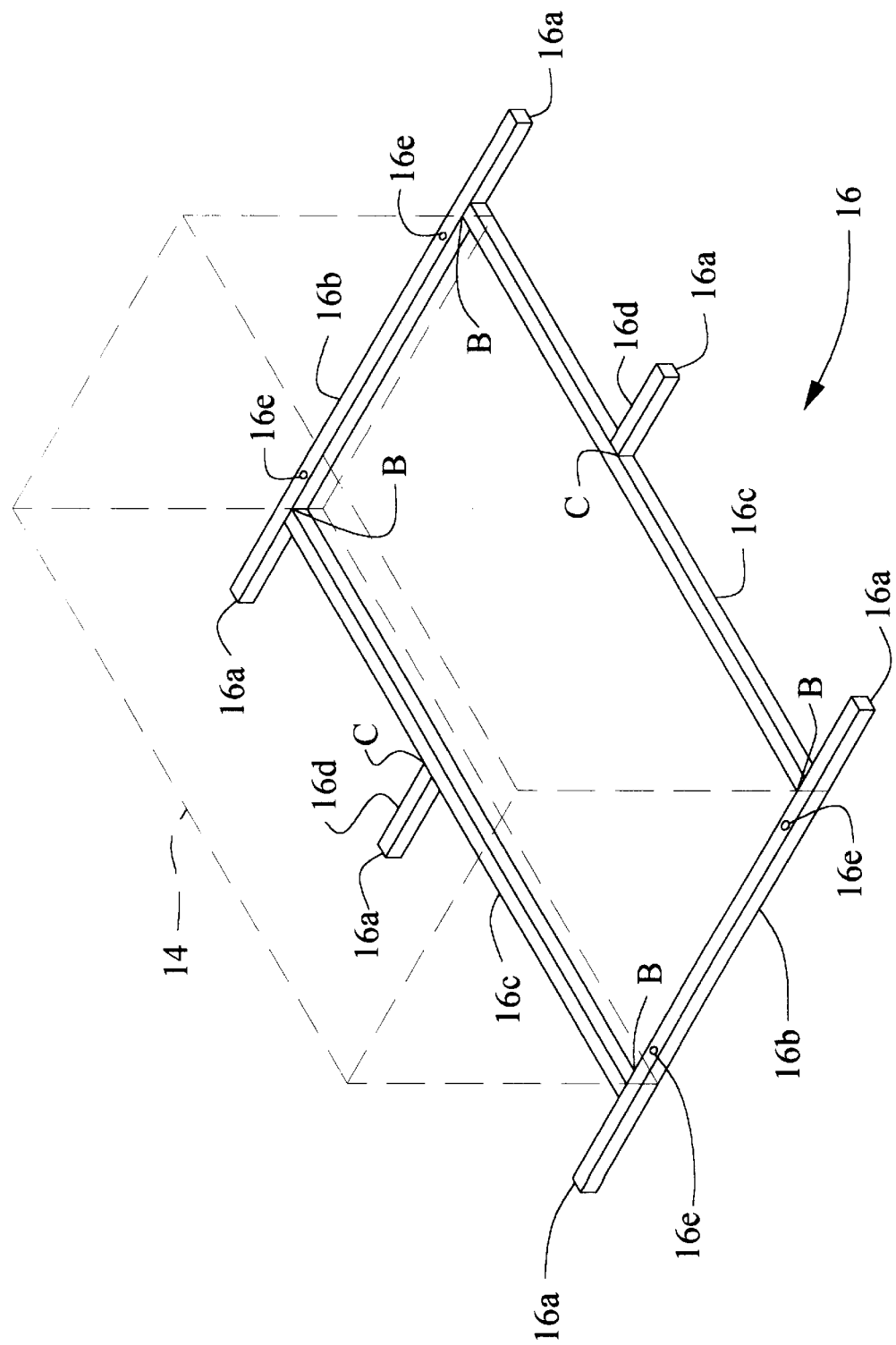
FIG. 4 is a perspective view of the reinforcement frame shown in FIG. 1 with the plastic tank of FIG. 1 depicted by hidden lines.

Referring now to FIG. 4, reinforcement frame 16 of FIG. 1 is shown in perspective view with broken lines depicting the general location of tank 14. Frame 16 is constructed with tubular steel rods welded together to form a high strength frame for anchoring the shelter 10 to a device such as ground anchors (not shown) that screw into the earth or a concrete slab (not shown) having anchor studs mounted therein. Each of the protruding portions 16a of frame 16 are easily attached to an anchoring device. Through-holes may optionally be vertically drilled in the protruding portions 16a of frame 16 to facilitate attachment of frame 16 to an anchoring device.

The construction of frame 16 is achieved by positioning tubular rods in a plane and welding the rods to one another to form the desired arrangement shown in FIG. 4. Two end rods 16b are welded to inner rods 16c at locations indicated by the letter "B". Small rods 16d are welded to rods 16c at approximately the mid-point of rods 16c at locations indicated by the letter "C. It should also be noted that alternative materials such as aluminum, cast iron, reinforced plastic or other materials known in the art of building construction may serve as a substitute for the tubular steel rods in the construction of frame 16. A "one-piece" frame of reinforced plastic is possible given technology known today in the art, though presently the cost of a steel frame makes it more desirable. Frame 16 provides convenient lifting attachment points at 16a as well as providing anchoring locations for installation of the portable severe weather storm shelter 10 of the present invention. Apertures 16e are through-holes for receiving bolts and the like as shown in more detail in FIG. 8.

Figure 5:
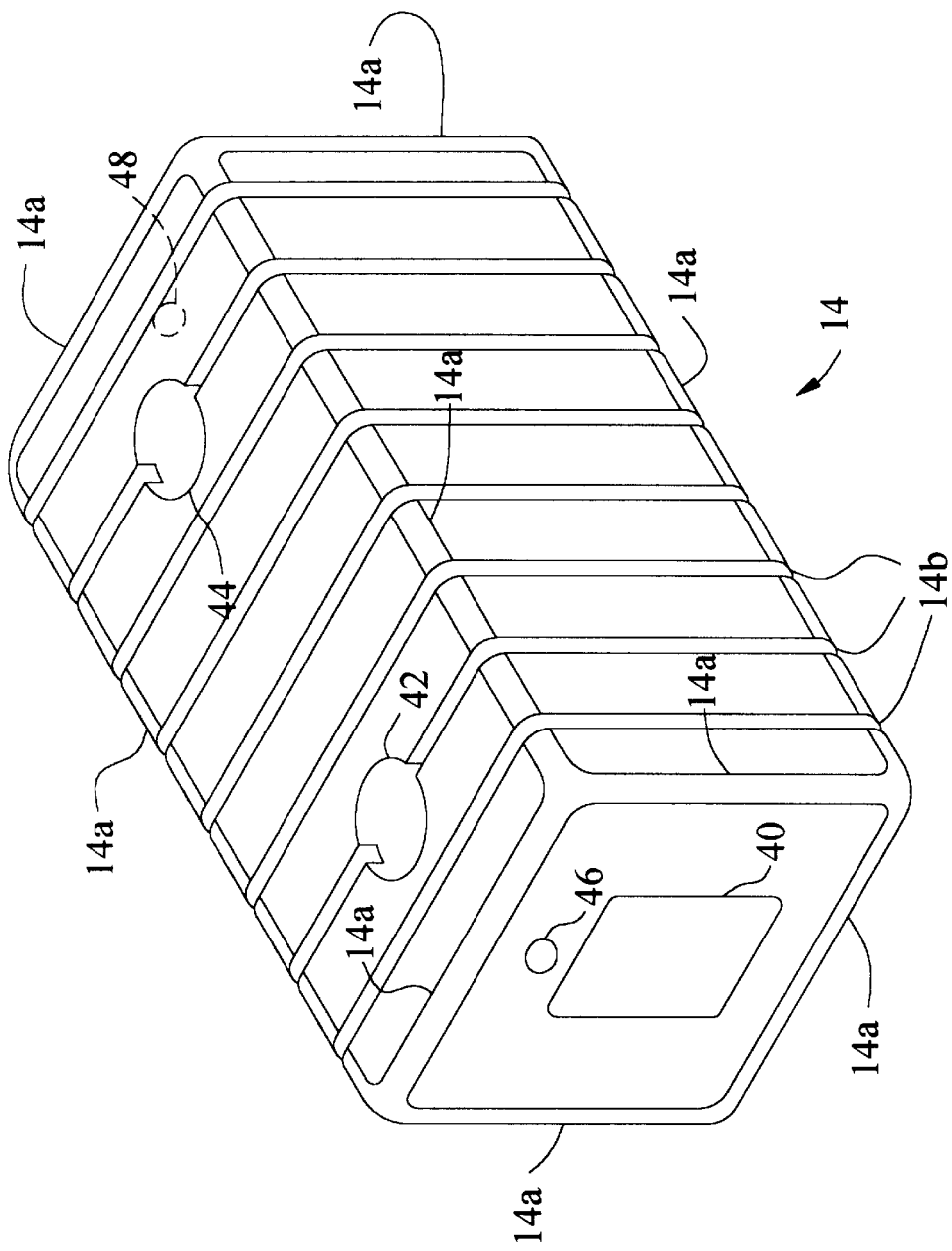
FIG. 5 is a perspective view of the thin-walled tank of FIG. 1.

Referring now to FIG. 5, a perspective view of the thin-walled tank 14 of FIG. 1 is shown. Tank 14 includes a door aperture 40, window aperture 42, window aperture 44, ventilation conduit aperture 46 and ventilation conduit aperture 48. Door aperture 40 is situated in alignment with door 17 of FIG. 3. Window apertures 40 and 42 are situated in corresponding locations with windows 22 and 24, respectively, of FIG. 1. Ventilation apertures 46 and 48 receive the ventilation conduits 18 and 20, respectively. Tank 14 has beveled or chamfered corners and edges 14a typical of plastic molded containers. Tank 14 also includes a plurality of support ribs 14b that encircle tank 14 to enhance the structural stability of tank 14.

Device 10 provides a safe enclosure wherein the occupants are protected from potential injury that may result from severe weather conditions. The convenient anchor locations 16a (FIG. 4) for anchoring device 10 are particularly desirable when using spiral ground anchors (not shown) that screw into the ground.

Figure 6:
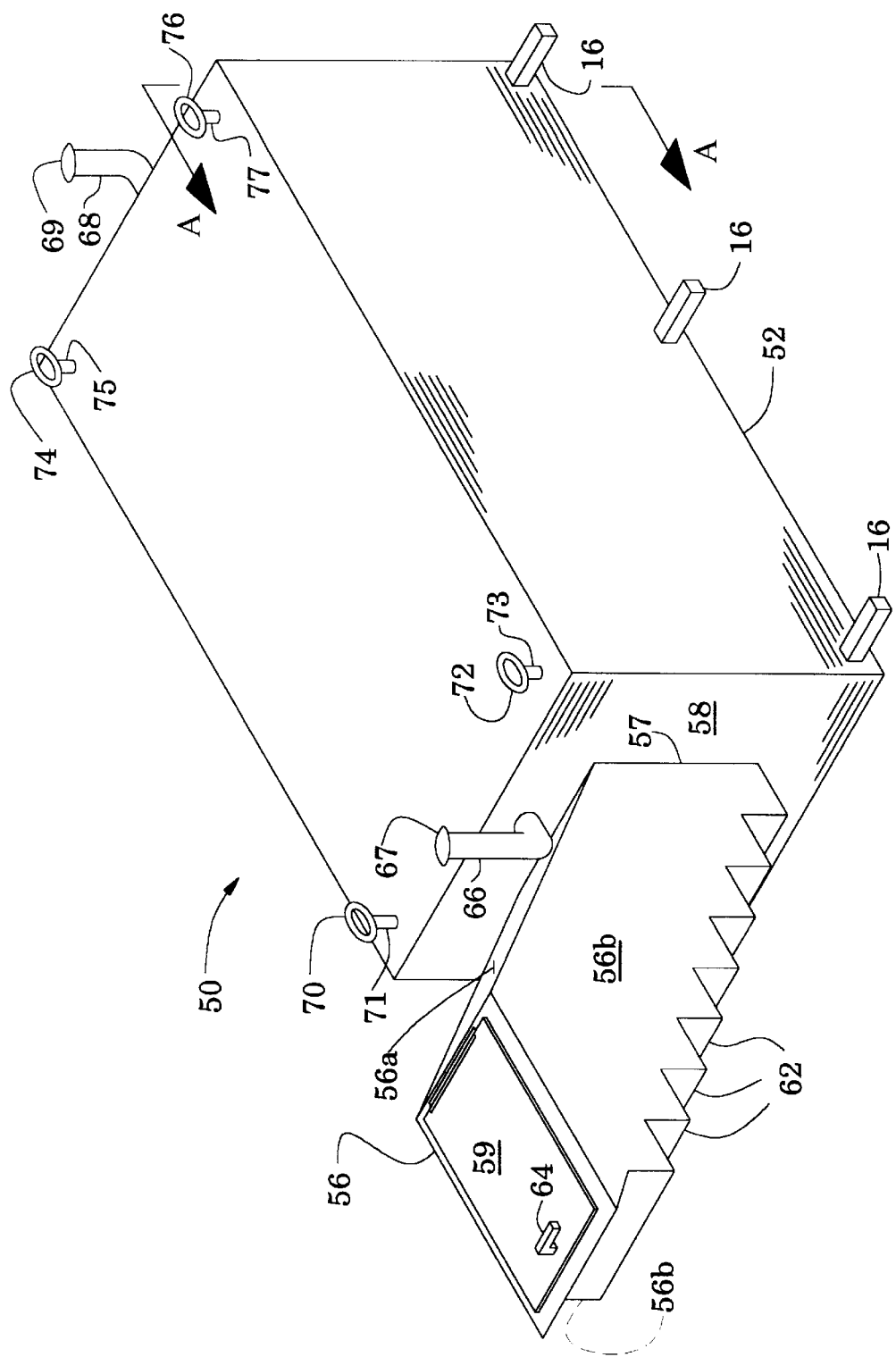
FIG. 6 is a perspective view of another embodiment of a portable severe weather storm shelter according to the present invention.

Referring now to FIG. 6, a perspective view of another embodiment of a portable severe weather storm shelter 50 according to the present invention is shown. A protective layer 52 is formed about a thin-walled tank 54 (shown in detail in FIG. 8). Rectangular reinforcement frame 16 (see FIG. 4) is surrounded by protective layer 52 and extends outward through protective layer 52 at six distinct locations. Three of the six locations where frame 16 protrudes through protective layer 52 are not visible in FIG. 6, but those locations are symmetrically opposed to the frame portions shown in FIG. 6 and are shown as protruding portions 16a in FIG. 4. Access chute 56 provides a pathway for entry into shelter 50 from a location above ground. This embodiment of the severe weather storm shelter 50 is situated substantially below ground, with access provided through chute 56. Chute 56 is an inclined and enclosed passageway that provides convenient access to the interior of shelter 50. Chute 56 includes a top wall 56a, side walls 56b, and steps 62 that form the lower surface of the chute. Chute 56 is attached at location 57 to surface 58 of protective layer 52. Door 59 is attached to hinge 60. Hinge 60 is securely attached to chute 56. Chute 56 includes an aperture (not shown) situated immediately adjacent door 59 and sized to conform with the dimensions of door 59. Door 59 provides an entry way into the interior of chute 56 and shelter 50. Steps 62 are formed in chute 56 to enable safe entry into and exit from within shelter 50. Handle 64, attached to door 59 and provides a latching mechanism to secure door 59 to chute 56.

Ventilation conduits 66 and 68 extend through protective layer 52 and through the walls of tank 54, into the hollow interior of tank 54 to provide a fluid passageway for fresh air to circulate into and out of the interior of tank 54. Protective caps 67 and 69 prevent rain, snow and debris from entering into the fluid conduits 66 and 68 and are mounted in a spaced apart fashion from the distal ends of fluid conduits 66 and 68 thereby allowing air to flow between the caps and the fluid conduits similar to a chimney cap. Lifting eyes 70, 72, 74 and 76 are attached to the distal ends of rods 71, 73, 75, and 77, respectively. Rods 71, 73, 75, and 77 extend into protective layer 52 and are secured or attached to frame 16 as shown in more detail in FIG. 8. Lifting eyes 70, 72, 74, and 76 are sturdy attachment locations for lifting the entire shelter 50.

Figure 7:
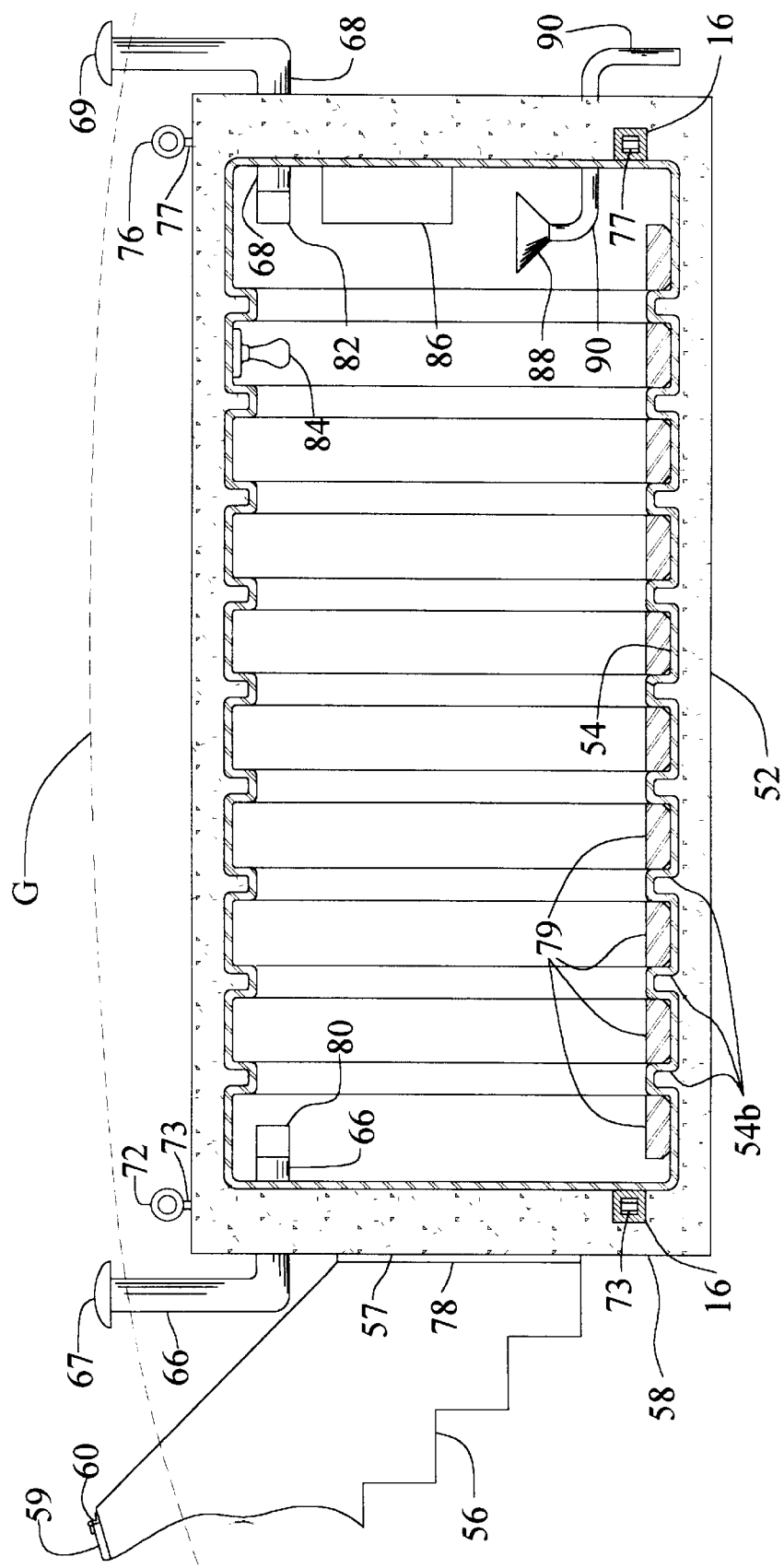
FIG. 7 is a cross-sectional view of the shelter of FIG. 6 looking in the direction of the arrows labeled A—A.

Shelter 50 is located below ground, as shown in FIG. 7. Ventilation conduits 66 and 68 extend above ground level so that fresh air may enter therein. The uppermost portion of chute 56, including door 59 and handle 64, are situated above or at ground level so that entry into door 59 is facilitated.

Tank 54 is made of a plastic material, such as polyethylene or similar moldable plastic material. Protective layer 52 is preferably a fiber-filled concrete material. Door 59 is made from metal or reinforced plastic or may be made from materials well known in the art for strength and durability. Chute 56 is constructed of a plastic material, such as polyethylene or similar materials well known in the art. Lifting eyes 70, 72, 74 and 76 are made from high strength steel. Rods 71, 73, 75, and 77 are made of high strength steel. Ventilation conduits 66 and 68 are made of durable plastic such as PVC or corrosion resistant metal. Hinge 60 is a piano hinge and is preferably made from a material that is resistant to rust or degradation when exposed to the elements.

Referring now to FIG. 7, a cross-section of the portable severe weather storm shelter 50 looking in the direction of the arrows labeled A—A of FIG. 6 is shown. Shelter 50 is disposed substantially below ground level indicated by the broken line labeled G. Protective layer 52 is shown formed and disposed about tank 54. Protective layer 52 surrounds and encases tank 54 providing a strong durable protective barrier against the forces of nature. Frame 16 is shown in cross-section immediately adjacent tank 54. Frame 16 is sized just large enough to receive tank 54 therein as depicted in FIG. 4. Portions of rods 73 and 77 are viewable in the interior of the cross-section of frame 16. Rods 73 and 77 extend upward through protective layer 52. Lifting eyes 72 and 76 are shown attached to the distal ends of rods 73 and 77, respectively. Ventilation conduits 66 and 68 extend through protective layer 52 and through tank 54 into the interior of tank 54 providing passageways for fresh air. Protective caps 67 and 69 are also shown. Chute 56 is shown attached to surface 58 at location 57. A seal or gasket 78 is situated between chute 56 and surface 58 to provide an air and moisture seal therebetween. A portion of door 59 is shown. Hinge 60 is attached to chute 56 and door 59 and enables door 59 to rotate open and closed. Ribs 54*b* are formed in tank 54 to add structural support thereto. Floor inserts 79 are disposed between ribs 54*b* to provide a level surface within the tank 54 for occupants to walk thereon. Floor inserts 79 extend substantially across the lower surface of tank 54. Floor inserts 79 are made of plastic or wood.

In the interior of tank 54, fans 80 and 82 are attached to ventilation conduits 66 and 68, respectively. Fans 80 and 82 force air movement through the ventilation conduits 66 and 68. Preferably, fan 80 forces air in and fan 82 forces air out of the interior of tank 54. Light bulb 84 provides a source of light in the interior of tank 54. Power unit 86 includes a trickle charge circuit and a battery connected to the output of the trickle charge circuit. An external power source (not shown) supplies a power signal to the trickle charge circuit of power unit 86 to maintain the charged state of the battery contained therein. A solar power array situated above ground or a connection to household AC power provide the power signal to power unit 86. Power unit 86 provides a source of power for the fans 80 and 82 as well as light bulb 84. Drainage basin 88 is fluidly connected to drain pipe 90. Waste fluids are disposed of into drainage basin 88.

Figure 8:
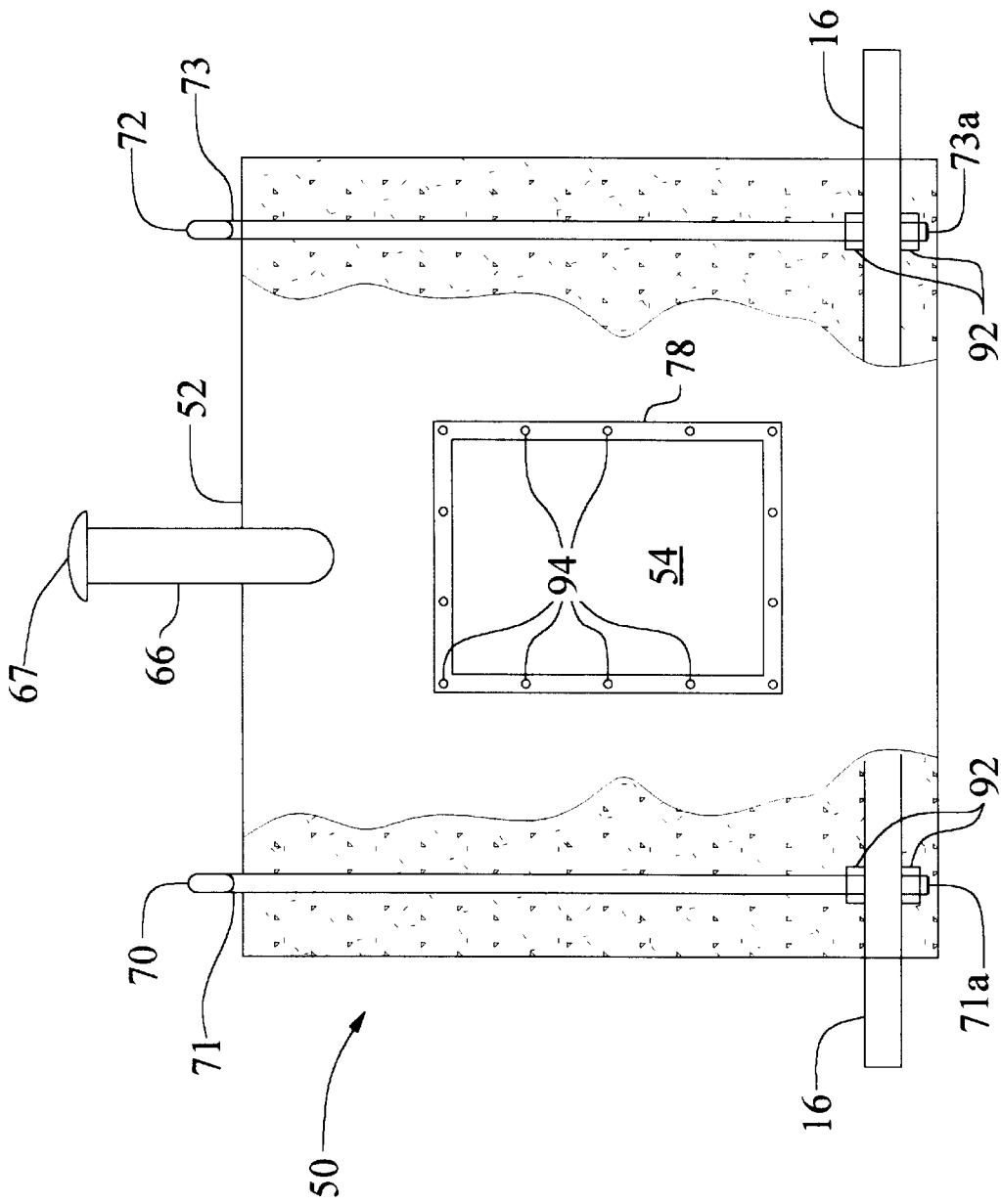
FIG. 8 is a partial cut-away side view of the shelter of FIG. 6 with the access chute removed.

Referring now to FIG. 8, a partial cutaway side view of the portable severe weather storm shelter 50 is shown. In the cutaway portions of FIG. 8, rods 71 and 73 are depicted. Rods 71 and 73 include threaded ends 71*a* and 73*a* disposed through frame 16 in apertures 16*e* (see FIG. 4) with nuts 92 securing the rods 71 and 73 to frame 16. Rods 75 and 77 (shown in FIGS. 6 and 7) are identical to rods 71 and 73 in all details and in the manner in which they are secured or attached to frame 16. Alternatively, rods 71, 73, 75 and 77 have a shoulder formed therein just above frame 16 to limit the length or quantity of rod that is inserted into frame 16, thereby providing a mechanism for suspending the rods in position while protective layer 52 is formed about tank 54. Gasket or seal 78 is shown disposed about corresponding apertures in protective layer 52 and tank 54. A plurality of threaded mounting studs 94 extend through seal 78 and are secured in protective layer 52 to provide a means whereby chute 56 is attached to surface 58. Typical installation of studs 94 would include drilling holes into protective layer 52 and mounting the studs therein using techniques well known in the construction art. Seal 78 is disposed on threaded mounting studs 94. Lifting eyes 70 and 72 are shown at the distal ends of rods 71 and 72 respectively. Also shown in FIG. 8 are ventilation conduit 66 and protective cap 67.

Figure 9:
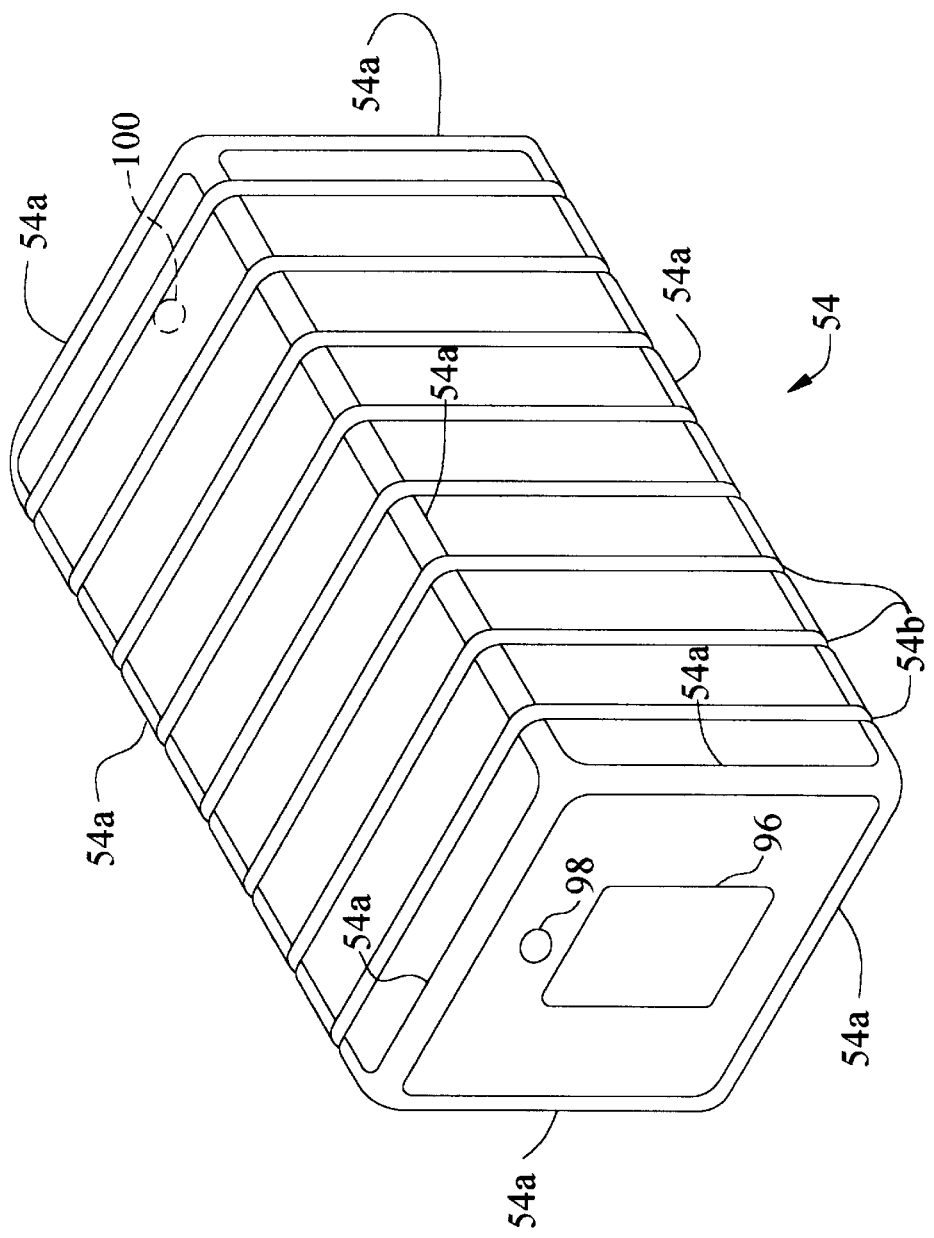
FIG. 9 is a perspective view of the thin-walled tank of FIG. 7.

Referring now to FIG. 9, a perspective view of the thin-walled tank 54 of FIG. 7 is shown. Tank 54 includes a door aperture 96, ventilation conduit aperture 98 and ventilation conduit aperture 100 (indicated by broken lines). Door aperture 96 is situated in alignment with door 59. Ventilation apertures 98 and 100 receive the ventilation conduits 66 and 68, respectively. Tank 54 has beveled or chamfered corners and edges 54*a* typical of plastic molded containers. Tank 54 also includes a plurality of support ribs 54*b* that encircle tank 54 to enhance the structural stability of tank 54.

In order to reduce shipping and related costs in the production of shelter 50, construction of shelter 50 may take place at the site of installation, thereby significantly reducing shipping and delivery costs associated with shelter 50. Particularly, fiber-filled concrete used to form protective layer 52 is quite heavy, and much less expensive to purchase at the site of installation of shelter 50. On site installation of shelter 50 includes the following steps. A rectangular hole is dug in the ground and frame 16 is placed therein. Lifting eyes 70, 72, 74 and 76 are attached to the frame. Thin-walled tank 54 is situated within frame 16. Temporarily, an aperture cover (not shown) is attached to tank 54 at location 57 to cover the access aperture 96 of FIG. 9. Fluid conduits 66 and 68 and drain pipe 90 are disposed in their proper location and are supported in place by temporary suspension means. Fiber-filled concrete is poured about tank 54 and frame 16 to form protective layer 52. Next the ground adjacent surface 58 of tank 54 is excavated, the aperture cover at location 57 is removed and chute 56 is attached at location 57 onto studs 94 of FIG. 8.

Should it become desirable to move shelter 50, earth above chute 56 must first be removed. Next, chute 56 is detached and removed from its attachment location 57. Earth atop shelter 50 is removed and a crane is attached to lifting eyes 70, 72, 74 and 76. Shelter 50 may then be transported to a new location for installation.

Although the tank 54 and chute 56 of FIG. 7 are shown as separate items of the shelter 50, it is contemplated that the tank 54 and chute 56 may be molded as a single integral plastic component thereby eliminating the need for seal 78.

Figure 10:
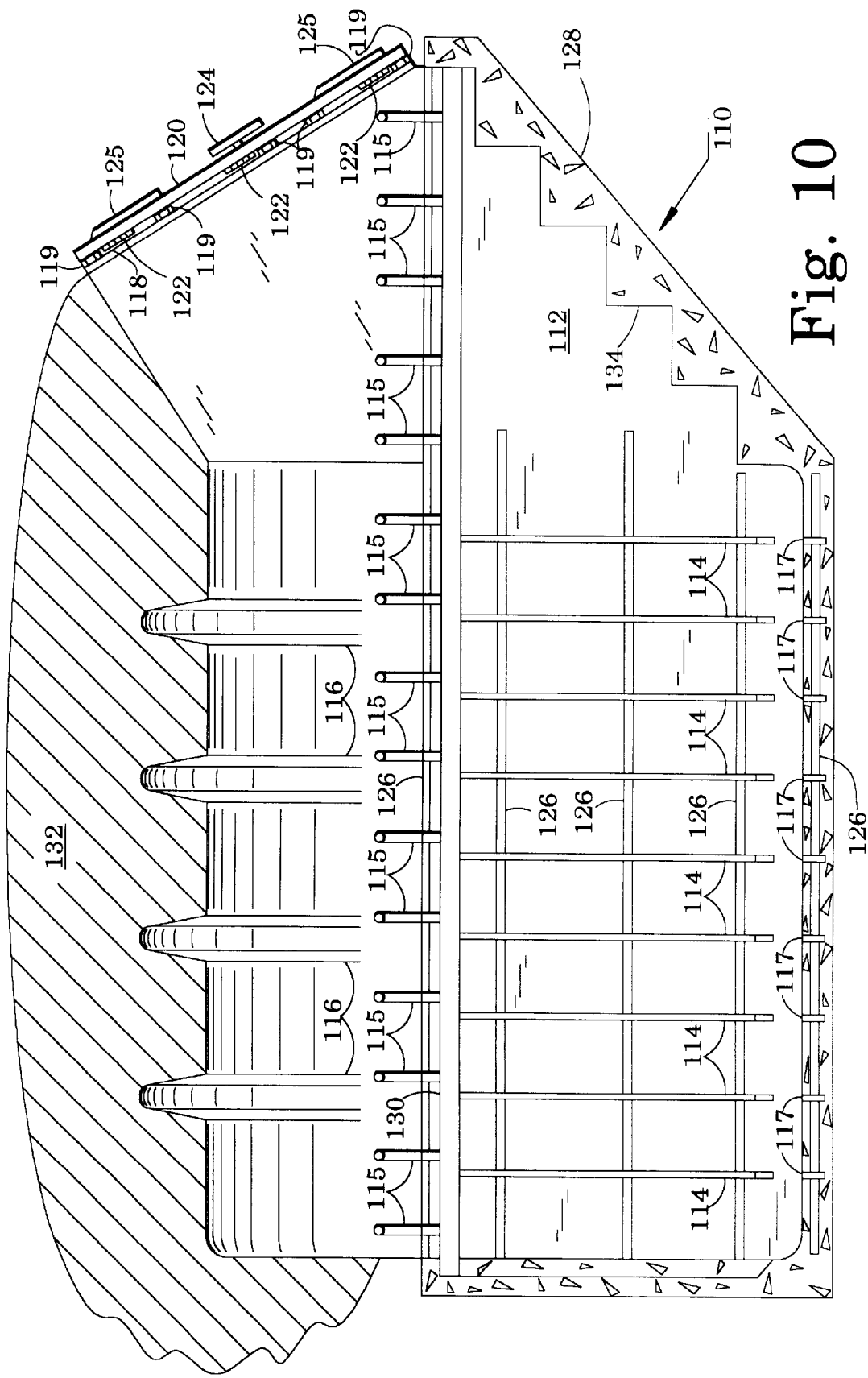
FIG. 10 is a side view of another embodiment of a portable severe weather storm shelter according to the present invention.

Referring now to FIG. 10, a side view of another embodiment of a portable severe weather storm shelter 110 according to the present invention is shown. The shelter 110 includes a unitary enclosure or tank 112 having reinforcement ribs 114, 115 and 116. Opening 118 in enclosure 112 has a door 120 mounted thereover. A plurality of bolts 119 secure door frame 121 over opening 118 in enclosure 112. Door frame 121 includes hinges 122 attached thereto. Door 120 is mounted on hinges 122 and includes a handle 124 and latching mechanism (not shown) to secure the door in a closed position against enclosure 112. Vent covers 125 are disposed over two apertures (not shown in FIG. 10) in door 120 and provide a passageway for fresh air circulation into and out of the interior of enclosure 112. A rubber seal (not shown) provides a water tight seal between door 120 and door frame 121. Steel reinforcement bars 126 are inserted through apertures (shown in FIG. 11 and 12) in ribs 114, 115 and 117 prior to disposing shelter 110 below ground.

When properly installed, shelter 110 is disposed below ground approximately deep enough to submerge enclosure 112 horizontally up to the breaker rib 130 (a breaker rib is the rib formed near a mold break line). Concrete 128 is poured about the lower portion of enclosure 112 as shown. Concrete is also worked to flow beneath stairway 134. When uncured concrete 128 flows around and over reinforcement ribs 114, 115, 117 and reinforcement bars 126, enclosure shelter 110 is securely anchored in place below ground level. Concrete 128 also provides longitudinal reinforcement to the lateral interior surfaces of enclosure 112. Earth or dirt 132 is placed over the entire shelter 110 after concrete 128 has cured. Stairway 134 enables convenient access into the interior of shelter 110.

Enclosure 112 is preferably rotationally molded in a single piece from cross linked polyethylene or other suitable high strength polymer. Rotational molding produces a container or enclosure that is continuous having no seams through which moisture might penetrate. Door 120 and door frame 121, as well as hinges 122 and bolts 119 are preferably made of stainless steel to prevent corrosion and rust. It is also contemplated that door 120 and door frame 121 may be constructed of non-metallic durable materials such as high strength polymer plastics.

Concrete 128 is preferably a fiber-filled concrete as used with and described above in relation to shelter 10. Enclosure 112 is a rotationally molded single piece polyethylene unitary structure. One clear advantage of the unitary molded enclosure 112 is the moisture integrity of shelter 110 providing an absolute barrier against ground moisture attributable to rain and the like.

Figure 11:
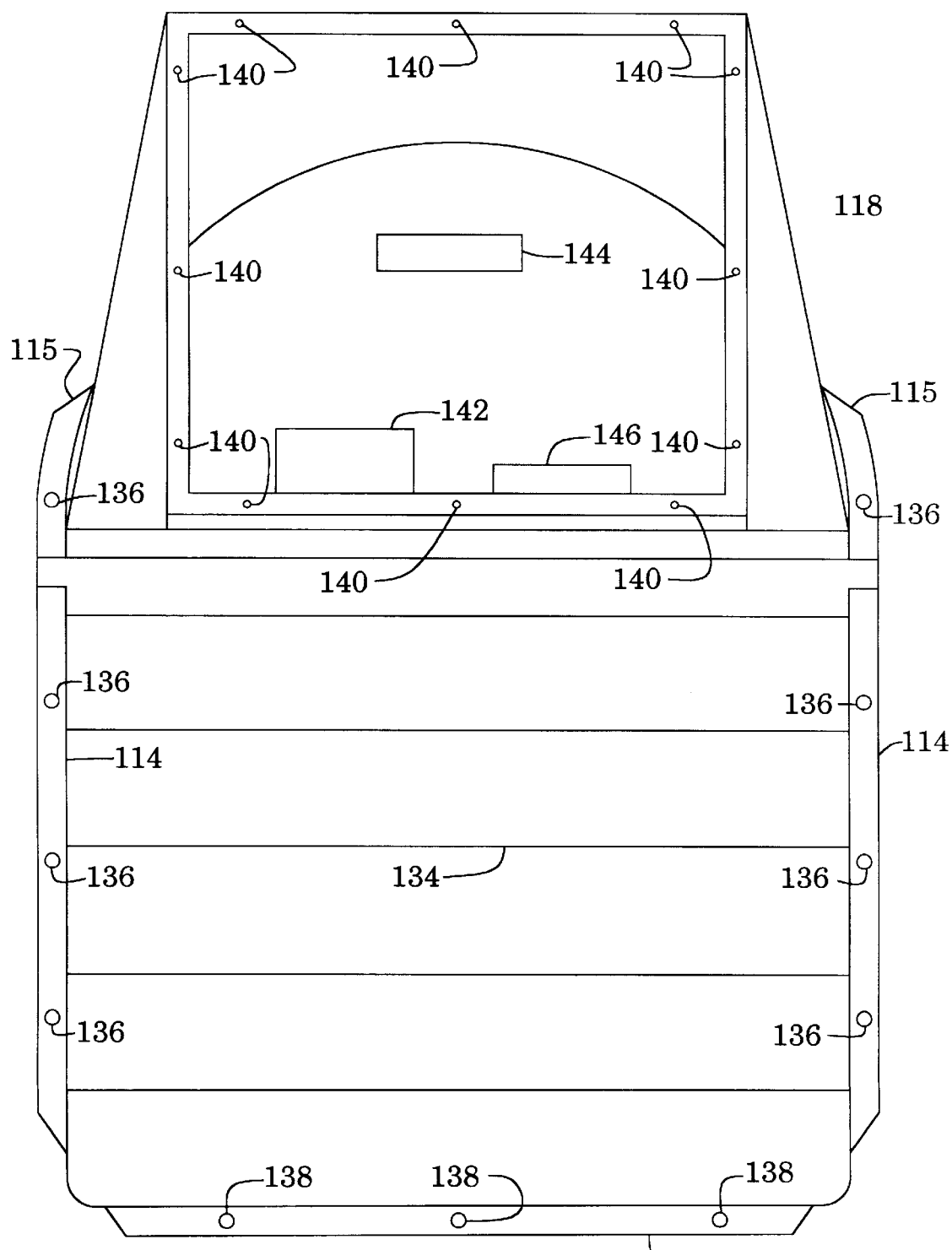
FIG. 11 is an end view of the device shown in FIG. 10 with the door removed.

Referring now to FIG. 11, an end view of enclosure 112 is shown with the door 120 and door frame 121 removed. Reinforcement ribs 114, 115, 116 and 117 are shown in FIG. 11, and apertures 136 and 138, through which reinforcement bars 126 are inserted, are also shown. Apertures 140 receive bolts 119 (shown in FIG. 10) and attach door frame 121 to enclosure 112 over door opening 118. A rechargeable battery pack or power pack 142 provides power to an electric lamp 144 and a radio 146. For the most efficient use of power, lamp 144 may be a fluorescent lamp, though common incandescent lamps are also contemplated. Radio 146 preferably provides the capability to monitor severe weather broadcasts from special weather information frequencies as well as standard AM and FM broadcast frequencies.

Figure 12:
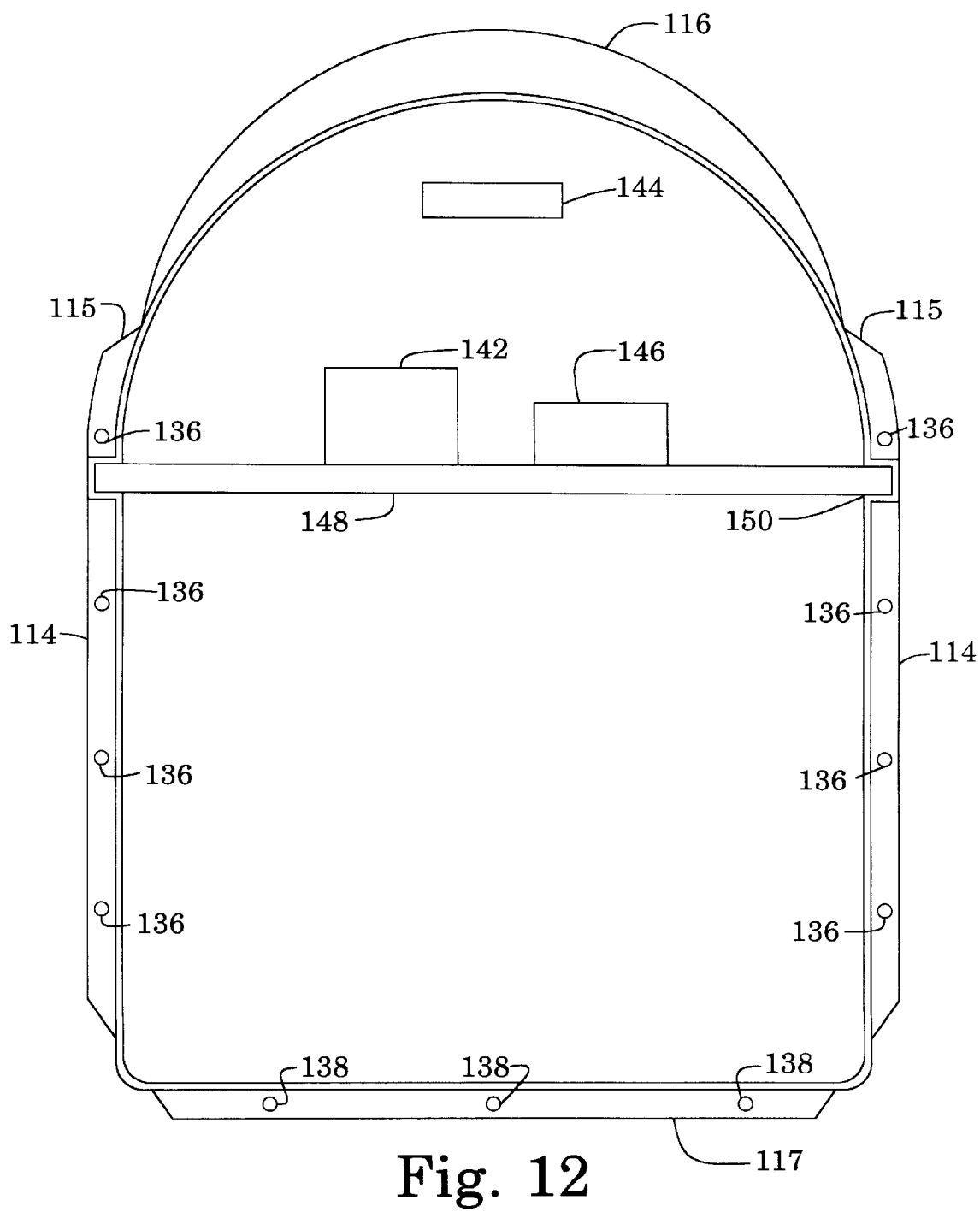
FIG. 12 is a cross-sectional view of the enclosure 112 shown in FIG. 10.

Referring now to FIG. 12, a cross-sectional view of the shelter 110 is shown. Semi-circular ribs 116 are integrally molded into enclosure 112. Structural support ribs 114, 115 and 117 are also shown, and are also integrally molded with enclosure 112. Apertures 136 and 138 receive reinforcement bars or rods therein. Power pack 142 and radio 146 are disposed on shelf 148. Shelf 148 is mounted in channel 150. Channel 150 is formed in enclosure 112 during the molding process. Lamp 144 is attached to an inner wall of enclosure 112 and provides a source of light.

Figure 13:
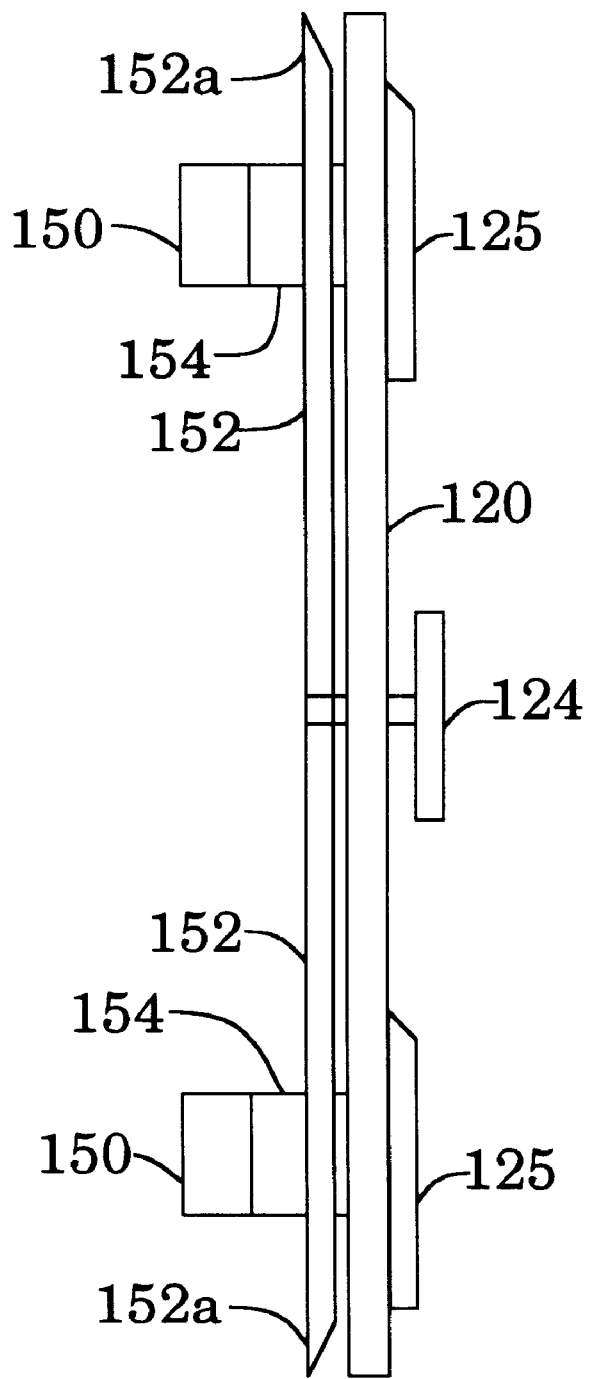
FIG. 13 is a side view of door 120 of FIG. 10.

Referring now to FIG. 13, a side view of door 120 is shown. Door 120 includes a latch handle 124 that is mechanically coupled to rods 152. Rods 152 are driven outward from handle 124 when handle 124 is rotated. The tapered ends 152a of rods 152 secure the door tightly against door frame 121 of FIG. 10 when handle 124 is rotated. Ventilation covers 125 are rectangular in shape and are disposed over apertures (not shown) centrally located in door 120. Conduits 154 are attached to door 120 over the apertures therein. Fans 150 are mounted on conduits 154. Fans 150 force air into and out of the interior of shelter 110. Electrical power for fans 150 is supplied by power pack 142 shown in FIGS. 11 and 12. Air filters or screens (not shown) are disposed within conduits 154 to filter the air entering into shelter 110.

It is contemplated that all of the "human amenities" shown in shelter 10 may be added to shelter 110, such as a supply of drinking water, waste water drains, a window and the like. What has heretofore not been known is a portable unitary structure that may be permanently anchored in the ground at any given location to provide protection for humans from severe weather storms. As with the embodiments previously described, the ease of shipping and installation of shelter 110 enhance its desirability. Further, shelter 110 may be moved after installation if desired.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A portable severe weather storm shelter comprising:

a reinforcement cage including a first rod and a second rod disposed in spaced-apart parallel fashion, said cage also including a third rod attached to said first rod and said second rod, and a fourth rod attached to said first rod and said second rod and spaced apart from said third rod to form a substantially rectangular opening;

a thin-walled tank having sidewalls, a top and a bottom, said sidewalls having a first aperture and a second aperture therein, said thin-walled tank disposed in said substantially rectangular opening of said reinforcement cage;

a concrete layer formed about said tank and said reinforcement cage and including a first and second apertures aligned with the first and second apertures of said tank and a latch receiving means for receiving a latch mechanism;

a hinged door attached to said concrete layer and disposed over said first aperture of said concrete layer, said hinged door including latch means for securing said hinged door to said latch receiving means; and a ventilation conduit disposed in and through the second aperture of said thin-walled tank and the second aperture of said concrete layer.

2. The shelter of claim 1 wherein:

said thin-walled tank includes a third aperture in said top;

said concrete layer includes a third aperture disposed adjacent and aligned with the third aperture of said thin-walled tank; and window means for allowing light to pass therethrough disposed within said third aperture and attached to said concrete layer.

3. The shelter of claim 2 wherein said reinforcement cage is constructed of tubular steel rods that are welded together.

4. The shelter of claim 3 wherein said thin-walled tank is made of plastic.

5. The shelter of claim 4 including a drain pipe means extending through said concrete layer and through said thin-walled tank to provide a liquid drain path from within said thin-walled tank.

6. The shelter of claim 5 including:

a rechargeable battery that produces a power signal;

a solar panel attached to the outer surface of said concrete layer; said solar panel including power leads attached to said rechargeable battery; and a ventilation fan in fluid communication with said ventilation conduit, said ventilation fan receiving power from said power signal from said rechargeable battery.

7. The shelter of claim 6 wherein said first rod and said second rod extend out through said concrete layer formed about said tank in four distinct locations thereby providing a means for anchoring said portable severe weather storm shelter to an anchoring device.

8. A severe weather storm shelter comprising:

a rectangular frame member;

a thin-walled tank disposed within said rectangular frame member and having a door aperture therein;

a protective layer surrounding said thin-walled tank and encasing said rectangular frame, said protective layer including a door aperture aligned with the door aperture of said tank;

a hinged door attached to said protective layer and movable to expose and cover the door aperture of said protective layer; and anchoring means for securing said severe weather storm shelter to a secure base.

9. The shelter of claim 8 including a first ventilation conduit extending through said protective layer and through said thin-walled tank so that air may flow into said tank, and wherein said anchoring means are protrusions extending outward from and attached to said frame member, wherein said protrusions extend through said protective layer.

10. The shelter of claim 9 wherein:
said tank includes a window aperture;
said protective layer includes a window aperture substantially aligned with said window aperture of said tank; and
a window means attached to said protective layer and disposed over said window aperture.

11. The shelter of claim 10 including an electric ventilation fan situated in fluid communication with said first ventilation conduit and a second ventilation conduit extending through said protective layer and through said thin-walled tank.

12. The shelter of claim 11 including a battery situated within said tank, said battery producing a power signal and wherein said power signal is supplied to said ventilation fan.

13. The shelter of claim 12 including a drainage pipe extending through said protective layer and through said thin-walled tank providing a liquid drain path from within said tank.

14. The shelter of claim 13 wherein said rectangular frame member is made of a first rod and a second rod arranged in spaced-apart parallel arrangement and a third rod and a fourth rod disposed substantially perpendicularly to said first and second rods and attached at the endpoints thereof to said first and second rods, and wherein said first rod and said second rod extend outward through said protective layer at a first location and a second location to form said anchoring means.

15. The shelter of claim 14 including a solar panel attached to said protective layer, said solar panel supplying a charging signal to said battery.

16. The shelter of claim 15 wherein said protective layer is a fiber-filled reinforced concrete material and said tank is made of a plastic material.

17. The shelter of claim 16 wherein said first rod and said second rod of said rectangular frame member extend outward through said concrete layer at a third location and a fourth location and form a portion of said anchoring means.

18. The shelter of claim 17 wherein said frame includes a fifth rod attached to said third rod and a sixth rod attached to said fourth rod and wherein said fifth rod extends outward through said protective layer at a fifth location to form a portion of said anchoring means and said sixth rod extends outward through said protective layer at a sixth location to form a portion of said anchoring means.

19. The shelter of claim 18 wherein said frame is made from tubular steel rods welded to one another.

20. A portable severe weather storm shelter comprising:
a reinforcement cage including a first rod and a second rod disposed in spaced-apart parallel fashion, said cage also including a third rod attached to said first rod and said second rod, and a fourth rod attached to said first rod and said second rod and spaced apart from said third rod to form a substantially rectangular opening;
a thin-walled tank having sidewalls, a top and a bottom, said sidewalls having a first aperture and a second aperture therein, said thin-walled tank disposed in said substantially rectangular opening of said reinforcement cage;
a protective layer formed about and encasing said tank and said reinforcement cage, said protective layer including a first hollow and a second hollow, said first hollow aligned with the first aperture of said tank, and said second hollow aligned with the second aperture of said tank;
an inclined chute having side walls, a top, and a bottom defining a first opening and a second opening, and wherein said inclined chute is attached to said protective layer with said first opening situated adjacent and aligned with said first hollow of said protective layer, and wherein said second opening is situated at a location above said protective layer covering the top of said thin-walled tank;
a door attached to said inclined chute and situated over said second opening of said inclined chute;
latching means attached to said door for securing said door in a closed position over said second opening of said inclined chute; and
a ventilation conduit disposed in and through the second aperture of said thin-walled tank and the second hollow of said protective layer.

21. The shelter of claim 20 wherein said reinforcement cage is constructed of tubular steel rods that are welded together.

22. The shelter of claim 21 wherein said thin-walled tank is made of plastic and said protective layer is made of fiber-filled concrete.

23. The shelter of claim 22 including a drain pipe means extending through said concrete layer and through said thin-walled tank to provide a liquid drain path from within said thin-walled tank.

24. The shelter of claim 23 including:
a battery that produces a power signal;
a charging circuit that supplies a charging signal to said battery;
an electric light connected to said power signal; and
a ventilation fan in fluid communication with said ventilation conduit, said ventilation fan connected to said power signal.

25. A portable severe weather storm shelter comprising:
a thin-walled tank having vertical sidewalls, a top and a bottom, said top having an aperture therein, and each of said sidewalls including a plurality of vertical spaced apart parallel reinforcement ribs and wherein each of said ribs includes a plurality of spaced apart apertures therein such that said apertures in said ribs align directly with said apertures in each adjacent rib;
a plurality of reinforcement bars inserted through said apertures in said ribs;
a protective layer formed about the lower portion of said tank below said top;
a door frame disposed over said aperture and attached to said tank;
a door hingedly attached to said door frame and including latch means for securing said hinged door to said door frame; and
a ventilation conduit disposed in and through said door.

26. The shelter of claim 25 including:
a battery disposed within said thin-walled tank, said battery producing a power signal;
an electric light connected to said power signal; and
a ventilation fan in fluid communication with said ventilation conduit, said ventilation fan connected to said power signal.

27. The shelter of claim 26 wherein said protective layer is fiber-filled concrete and wherein said thin-walled tank is made of a polymer.

28. A portable severe weather storm shelter comprising:
a thin-walled tank having sidewalls, a top and a bottom, said top including an aperture therein and each of said sidewalls including a plurality of spaced apart parallel reinforcement ribs;

reinforcement means disposed about and adjacent said thin-walled tank;

a protective layer formed about said reinforcement means and said thin-walled tank, said protective layer situated below said top of said thin-walled tank;

a door hingedly attached over said aperture and including latch means for securing said hinged door in a closed position adjacent said top of said tank; and a ventilation conduit disposed in and through said door.

29. The shelter of claim 28 including:

a battery disposed within said thin-walled tank, said battery producing a power signal;

an electric light connected to said power signal; and a ventilation fan in fluid communication with said ventilation conduit, said ventilation fan connected to said power signal.

30. The shelter of claim 29 wherein said thin-walled tank is formed of polymer and said protective layer is fiber-filled concrete.

31. The shelter of claim 30 wherein said reinforcement means is a reinforcement cage including a first rod and a second rod disposed in spaced-apart parallel fashion, said cage also including a third rod attached to said first rod and said second rod, and a fourth rod attached to said first rod and said second rod and spaced apart from said third rod to form a substantially rectangular opening wherein said thin-walled tank is disposed.

32. The shelter of claim 30 wherein each of said reinforcement ribs of said tank includes a plurality of spaced apart apertures therein such that said apertures in said ribs align directly with said apertures in each adjacent rib and wherein said reinforcement means includes a plurality of reinforcement bars inserted horizontally through said apertures in said ribs.

* * * * *